G. HORNBY.
Die for Forging Car-Wheel Tires.

No. 211,158. Patented Jan. 7, 1879.

Witnesses
Thomas J. Bewley
S. W. Millett

Inventor
George Hornby
per Stephen Ustick, attorney

3 Sheets—Sheet 2.

G. HORNBY.
Die for Forging Car-Wheel Tires.

No. 211,158. Patented Jan. 7, 1879.

Witnesses
Thomas J. Bewly
S. W. Millett

Inventor
George Hornby
per Stephen Ustick Attorney

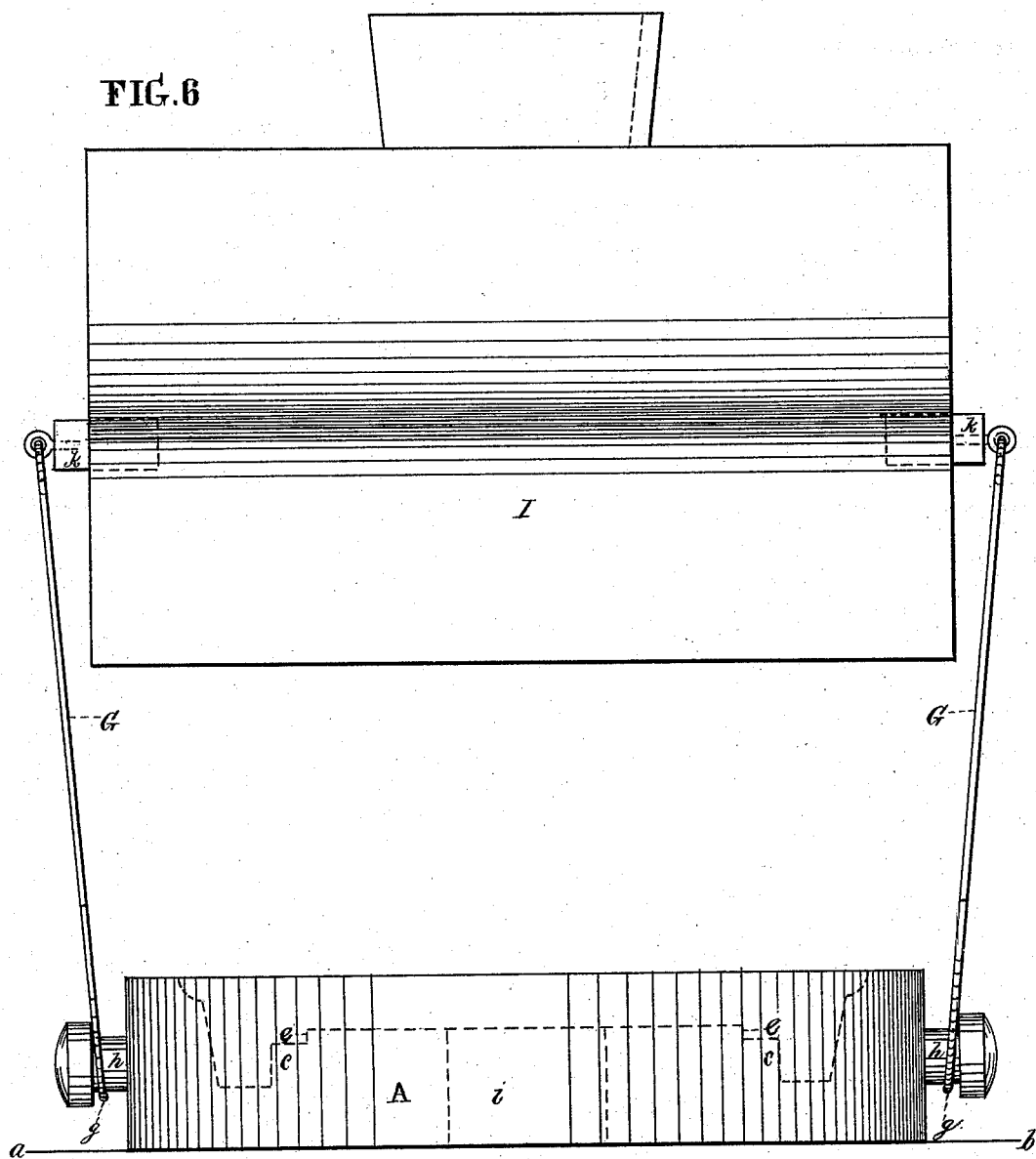

UNITED STATES PATENT OFFICE.

GEORGE HORNBY, OF LEWISTOWN, PENNSYLVANIA.

IMPROVEMENT IN DIES FOR FORGING CAR-WHEEL TIRES.

Specification forming part of Letters Patent No. 211,158, dated January 7, 1879; application filed March 5, 1878.

*To all whom it may concern:*

Be it known that I, GEORGE HORNBY, of Lewistown, in the county of Mifflin and State of Pennsylvania, have invented a new and useful Improvement in the Manufacture of Car-Wheel Tires, which improvement is fully set forth in the following specification and accompanying drawings, in which—

Figure 1:
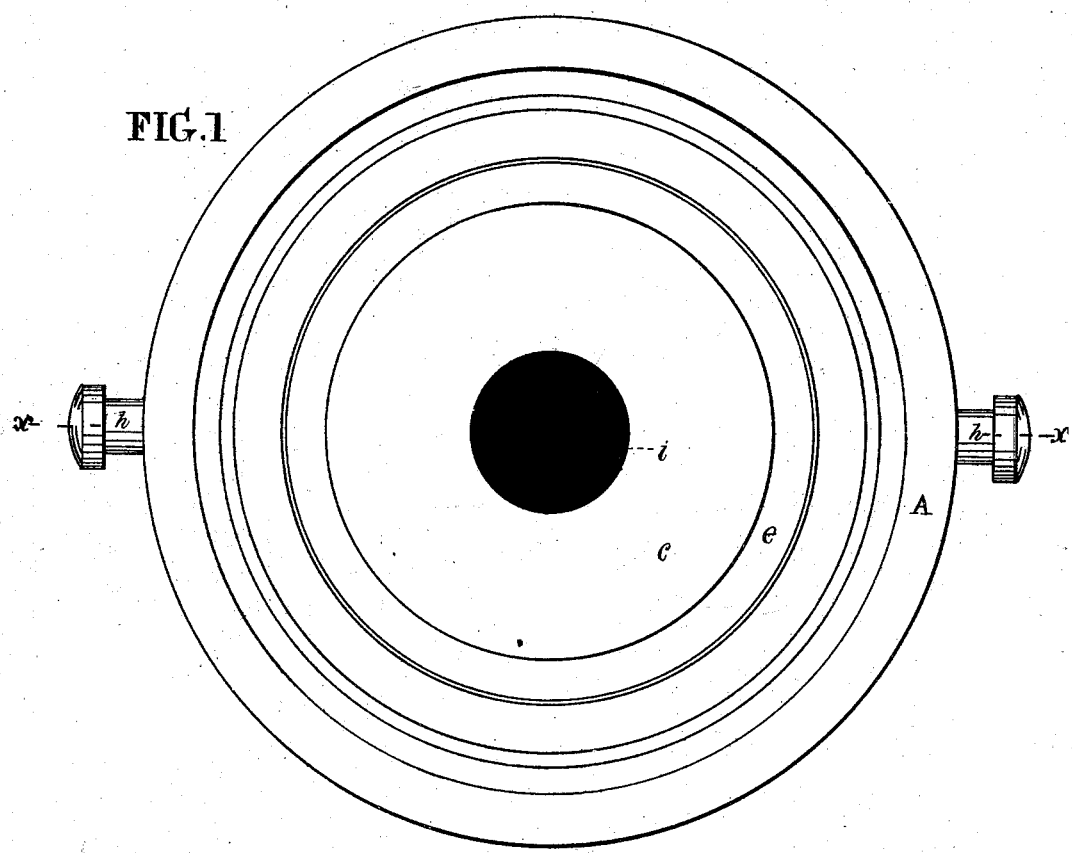
Figure 2:
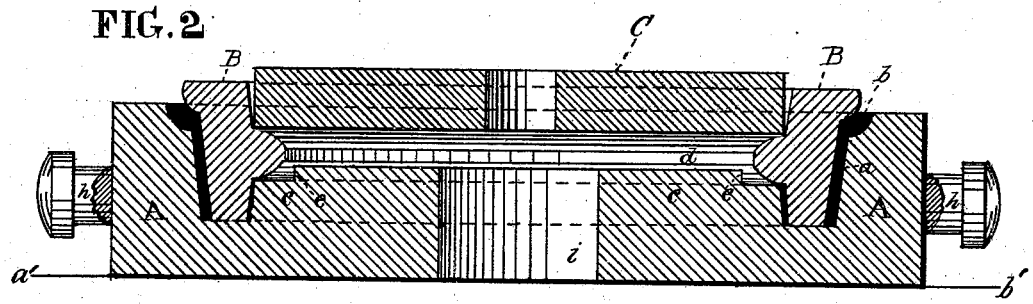
Figure 3:
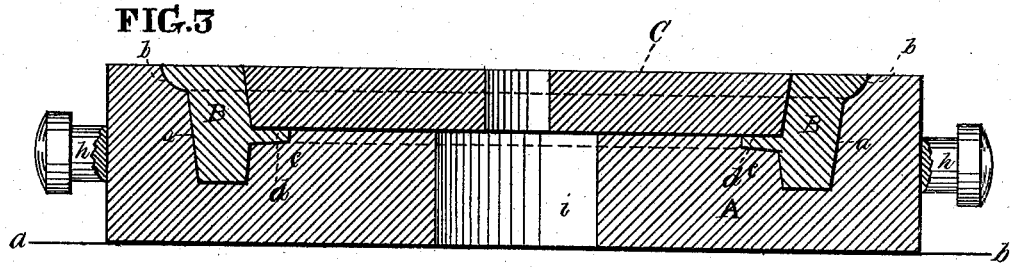
Figure 4:
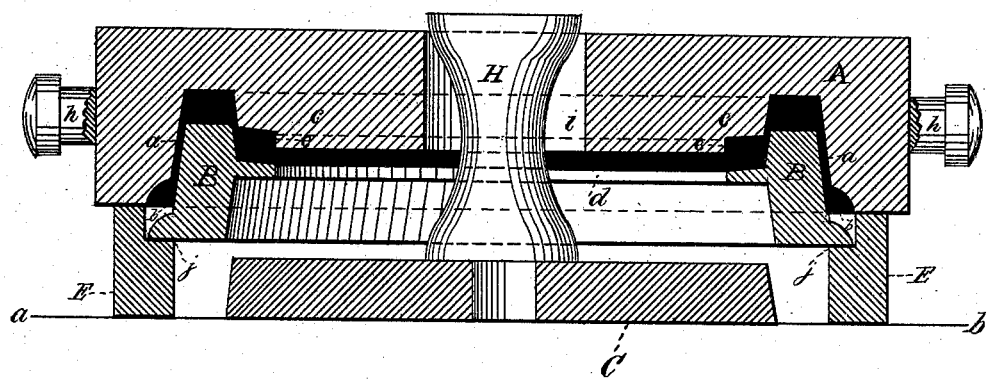
Figure 5:
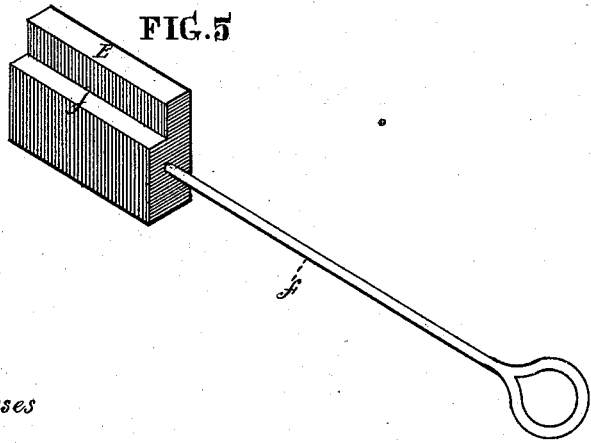

Figure 1 is a plan view of the matrix or die A. Fig. 2 is a cross-section of the same at the line $x\ x$ of Fig. 1, with the bloom B and central die C in position for the molding operation, the die A resting upon the anvil of a steam-hammer. Fig. 3, Sheet 2, is a like cross-section, the bloom B, however, being molded to its proper form and size for the milling operation. Fig. 4 is a cross-section in which the matrix or die is shown in its reversed position, with the bloom and central die removed from the matrix after the molding of the bloom. Fig. 5 is a perspective view of one of the supports E. Fig. 6 is a front elevation of the matrix A and hammer I, connected by means of the rods G G.

Like letters of reference in all the figures indicate the same parts.

The object of my invention is the employment of means whereby to effect an expeditious and complete preparation of the becked blooms for the milling operation.

I have a matrix or die for molding the periphery of the bloom and a portion of its inner annular surface, and a loose central die in combination therewith, for molding the remainder of said surface. The thickness of this central die is equal to the depth of the hub of the matrix, so that when the die is forced down, by successive blows of the steam-hammer, upon the becked bloom until its lower flat surface is brought to bear upon its bearing its upper flat surface is on a line with the horizontal edge of the rim of the matrix. The face of the hammer or ram is of sufficient length to project beyond the cavity of the matrix; but its breadth is much less, so as to leave a portion of the matrix at each side of the ram uncovered, to necessitate the turning around of the matrix during the molding operation, so as to bring all parts of the bloom under the hammer in succession as successive blows are given by the latter, the air in the mold at each blow being forced out of the same through its uncovered parts at the opposite sides of the hammer. Much greater solidity is thus given to the bloom than when the hammer or ram covers its whole area, and thus forces air into it, which causes cracks or other unsound places to be formed during the cooling of the metal.

When the molding operation is completed the matrix is turned over upon suitable supports and the bloom and central die removed. For this purpose the matrix is provided with trunnions, with which the ends of rods or chains are connected, the other ends of said rods or chains being connected to the hammer. By an upward stroke of the hammer the matrix is elevated far enough to swing clear of the anvil, and is then turned over and lowered upon the supports. Then a pin is placed in a central eye of the matrix, with its lower end resting upon the central die, and by strokes of the hammer upon the upper end of this pin the bloom and central die are detached from the matrix. The matrix, by an upward stroke of the hammer, is then elevated above the anvil and swung into its former position and lowered upon the anvil, ready for the next molding operation.

The matrix has a level bottom throughout its whole surface, so as to be used for an anvil, when required, for leveling the blooms or tires.

Referring to the drawings, A represents the matrix or die, into which the becked blooms are laid when brought from the furnace. It has an annular surface, $a$, on the interior of its rim, for molding the tread of the bloom B, and a curve, $b$, extended therefrom, for molding the flange thereof. Centrally arranged in the die A is the projection $c$, for forming the inner annular surface of the bloom outside of its rim $d$. This projection has an annular rabbet, $e$, for reducing the rib to its proper form and size.

C is a follower or loose die for molding the inner annular surface of the bloom inside of the rib.

The operation of molding the bloom is as follows: The die A is placed on the anvil of a steam-hammer, the face of the anvil being in the plane of the line $a'\ b'$, as represented in Fig. 2, and the bloom having been drawn from the furnace is placed in the matrix, and the follower or loose die C placed in position partly within the bloom, as represented. Then the hammer is put in operation, and as its face extends clear across the die A, as it forces the die C down to its lowest position, it, at the same time, hammers the bloom, so as to completely fill every part of the mold, as represented in the cross-section, Fig. 3. During the hammering operation the matrix is turned around on the anvil, so as to bring every part of the bloom under the hammer in succession.

To remove the bloom from the matrix the latter is placed in its reversed position, as seen in Fig. 4, upon the rabbeted supports E E, one of which is shown in detail in Fig. 5. These supports have rods $f$ for manipulating them.

For the purpose of changing the position of the matrix it is provided with trunnions $h\ h$ for the connection of one end of each of the rods G G, which are provided with eyes $g$ for that purpose. The other ends of said rods have connection with the removable projections $k\ k$ of the hammer I, so that by an upward stroke of the said hammer the matrix is drawn upward far enough to admit of its swinging clearly. It is then turned into its reversed position and lowered upon the rests E E. Two men, at the time of the lowering of the matrix, place the supports in a sufficiently accurate position, so that when the die A rests upon them, and the bloom is forced from it, the rabbets $j\ j$ of said supports will receive the bloom. Then the pin H is placed in the central eye $i$ of the die A by means of a suitable implement, which has prongs to pass over the diminished and middle part of the pin, the lower end of the pin being placed upon the central die C.

By a stroke of the hammer upon the upper end of the pin the bloom is loosened from the die A, and descends so as to rest upon the rabbets $j\ j$, and by a second stroke of the hammer the central die C is forced out of the bloom and falls upon the anvil. The die or matrix A is then, by an upward stroke of the hammer, elevated and swung into its former position, and the bloom being removed from the anvil the said die is lowered, so as to rest upon the same, ready for another molding operation.

By the means above described the blooms are brought so perfectly into proper form for rolling as to require but one heating, while, by the usual mode of preparing them for the mill, two heatings, at least, have been required.

The die A is made perfectly level on its lower side, so that it may be used as an anvil, when required, for leveling the blooms or tires by reversing its position to turn said side uppermost, the matrix side resting upon the anvil of the steam-hammer or other support.

I claim as my invention—

1. The matrix or die A, having a rim, solid bottom, and central projection or hub $c$ in a single piece, in combination with the central die C and hammer or ram I, substantially in the manner and for the purpose set forth.

2. The combination of the central die C and revoluble matrix A, with the hammer or ram I, having its face in one direction greater than the diameter of the cavity of the matrix, and less than said diameter in the other direction, substantially as and for the purpose set forth.

3. The supports E E, having rabbets $j\ j$, in combination with the die A, substantially in the manner and for the purpose set forth.

4. The reversible die A, having trunnions $h\ h$, in combination with the hammer I and connecting-rods G G, or equivalent device, substantially as and for the purpose set forth.

5. The driving-pin H, in combination with the die A, having a central opening, $i$, to receive it, and the central die C, for removing the bloom B from the die A and the central die from the bloom, substantially as set forth.

GEORGE HORNBY.

Witnesses:
M. L. BROSIUS,
D. MUTTHENBOUGH.